Feb. 8, 1966  A. C. COUTANT ETAL  3,233,805
FILM MOVING MECHANISM FOR MOTION-PICTURE CAMERA
Filed April 19, 1963  3 Sheets-Sheet 1
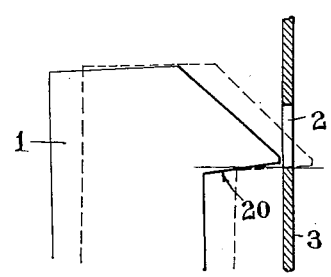
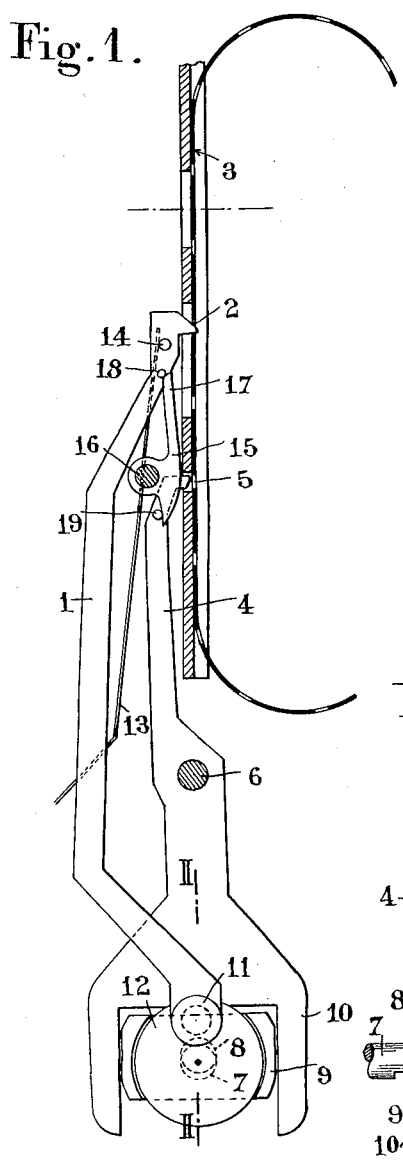
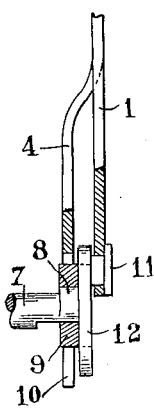
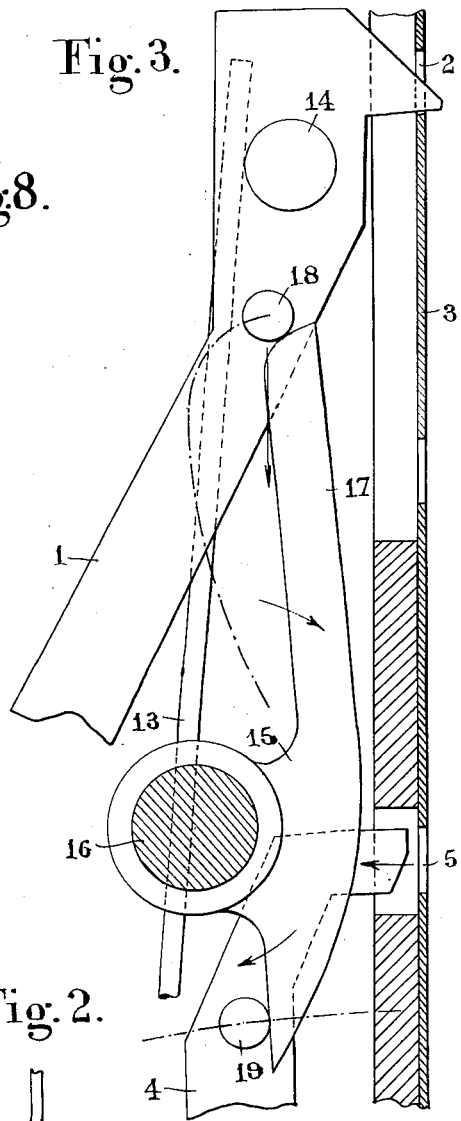

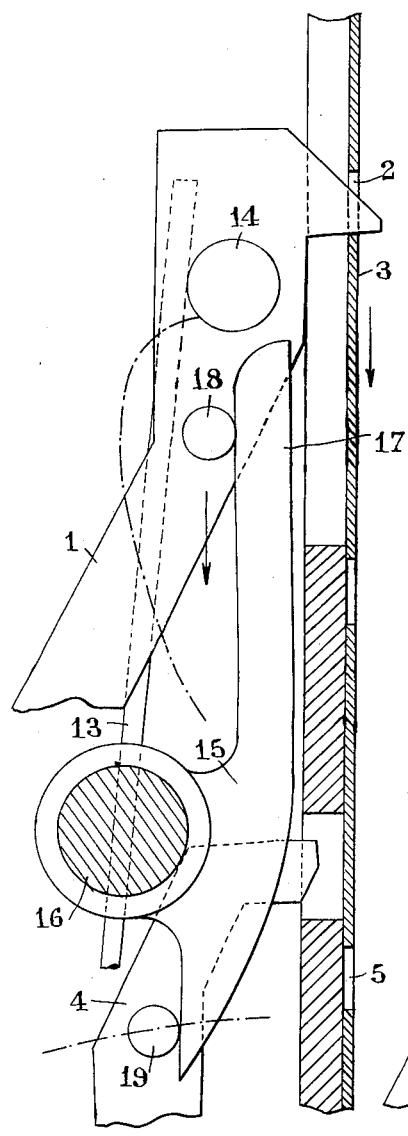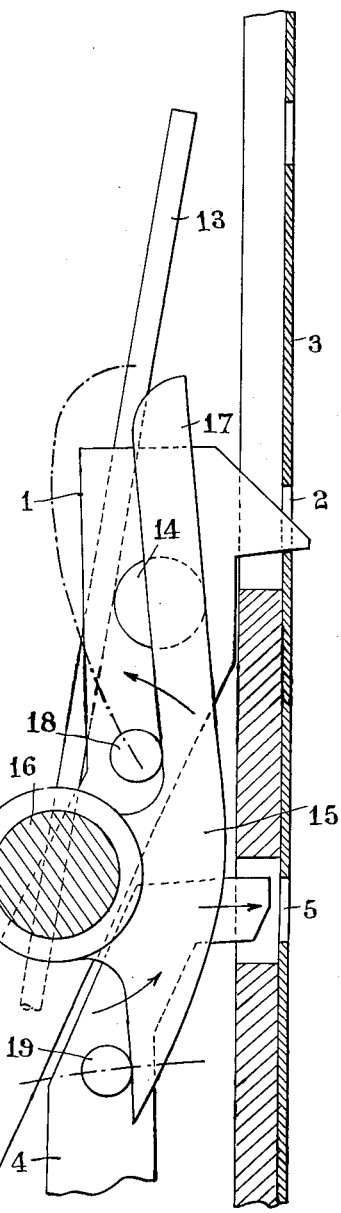

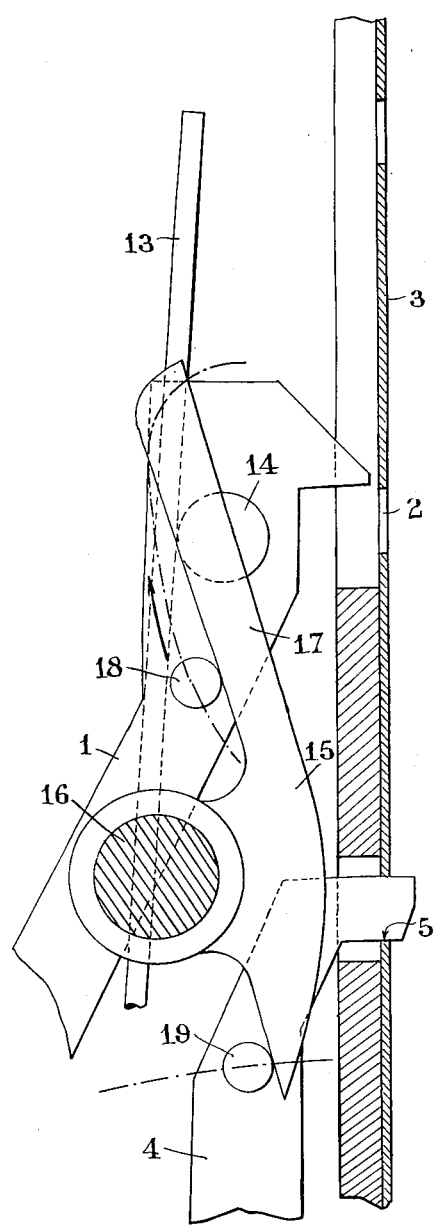
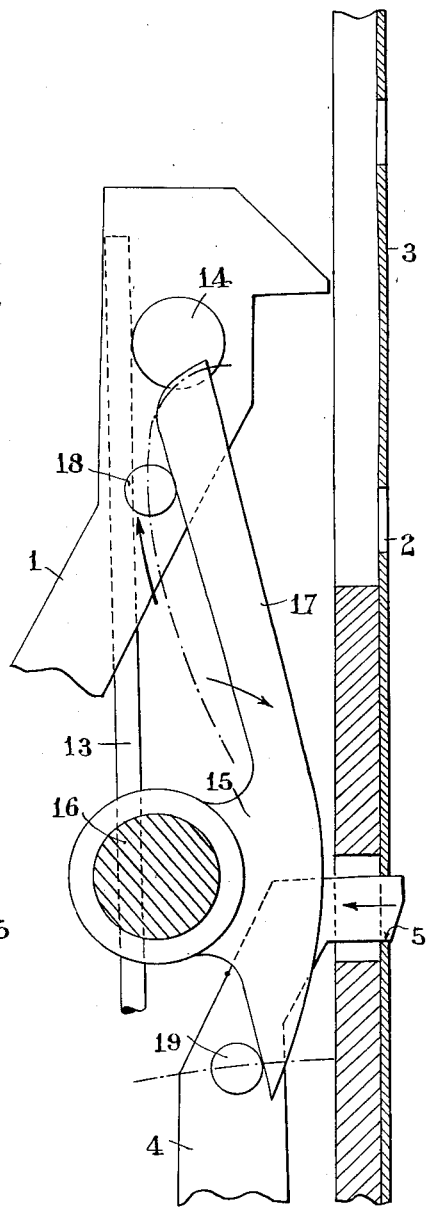

United States Patent Office 3,233,805
Patented Feb. 8, 1966

3,233,805
FILM MOVING MECHANISM FOR MOTION-PICTURE CAMERA
André Clément Coutant, 173 Ave. du Roule, Neuilly-sur-Seine, France, and Jacques Mathot, 44 Quai de Passy, Paris, France
Filed Apr. 19, 1963, Ser. No. 274,139
Claims priority, application France, July 30, 1962, 905,497, Patent 1,337,382
1 Claim. (Cl. 226—57)

The invention relates in general to motion-picture cameras and has specific reference to film moving mechanisms for cameras of this character.

It is known that it is extremely difficult to design and manufacture really noiseless motion-picture cameras. As a rule, a relatively noiseless operation is obtained by using a metal box or casing having its inner walls lined with rubber or like sound-damping material and receiving the camera proper.

In this case, a window of very thick glass must be provided and since the lens system is disposed behind this window the sharpness of the image definition is impaired. Moreover, any box or casing surrounding a camera constitutes a very heavy and cumbersome equipment and is therefore difficult to handle.

Of late years various attempts have been made with a view to avoid these drawbacks by constantly improving the film moving mechanisms in order to free motion-picture cameras from the subjection of these boxes. Thus, relatively noiseless mechanisms have been developed, but unfortunately the noise resulting from the contact between the film moving mechanism and the film proper constitutes a serious inconvenience and so far the results are far from perfect.

Now, according to this invention it has been found that a mechanism could be designed which is remarkable notably in that a very smooth contact is obtained between the film pilot claw and each film perforation engaged by this claw, many practical tests having proved the necessity of causing a very flexible engagement between the claw and the film perforations in order to avoid the simultaneous resonance of the film and of the mechanism in the region of intermittent motion of the film. Due to the absence of noise between the film and the mechanism at the beginning of the film shuttle movement, a light-weight, mechanically noiseless camera can be made which requires no sound-proofing box or the like.

To this end the film motion mechanism according to this invention is characterized in that the pilot-claw drive means are so designed that as the pilot claw engages the lower portion of each successive perforation of the film to be fed, said pilot claw is thus moved in a direction approximating as much as possible the perpendicular to the film surface, so that a tangential engagement or contact is effected which precludes any abrupt action. On the other hand the claw is not fixed on its support but resiliently urged toward the film so that it is not driven mechanically beyond its point of engagement with the film perforation.

The lower face of the pilot claw which is to contact the lower edge of the film perforation is slightly inclined upwards toward the film, so that by positioning the front end of the lower face of the claw at a level slightly above the lower edge of the film perforation to be engaged thereby, the transverse movement of the claw will be sufficient to ensure the proper engagement between its lower face and the lower edge of the film perforation.

The longitudinal up-and-down claw motion is produced positively from the rotary shaft controlling the transverse movement of the registration claw, and the transverse movements of the pilot claw are controlled or produced by the transverse movements of the registration claw.

The pilot claw is pivoted freely on the eccentric or crank pin controlling its longitudinal motion, a spring constantly urging this pilot claw toward the film. The pilot claw bears through a lateral pin on one arm of a two-armed lever acting as a cam controlling the transverse movement of the pilot claw during its upward stroke and retracting automatically to permit the vertical downward stroke of said pilot claw, said two-armed lever being pivoted freely on the camera structure, its angular position being constantly controlled by a pin rigid with the registration claw and engaged by the other arm of said lever, so that this registration claw will control through the medium of said lever the transverse movements of the pilot claw, thus ensuring a perfect synchronism between the different movements.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit and scope of the invention.

Other objects and advantages will become apparent from the following description taken in conjunction with the accompanying drawings, in which:

FIGURE 1 is a side elevational and part-sectional view showing the film moving mechanism of this invention;

FIGURE 2 is a fragmentary section taken upon the line II—II of FIG. 1;

FIGURE 3 is a fragmentary view showing on a larger scale the intermediate two-armed lever between the registration claw and the pilot claw, together with the spring urging the pilot claw toward the film;

FIGURES 4 to 7 are views similar to FIG. 3, showing the different component elements of the mechanism in their different successive positions during the image movement, and FIGURE 8 is an explanatory detail taken from FIG. 3.

The mechanism illustrated in FIG. 1 comprises as customary a pilot claw or pin 1 adapted to engage a perforation 2 in the film 3, to lower this film by one pitch or one height of the image carried thereby, and to move away from this perforation before rising again and engaging the next perforation. A registration claw 4 engages another perforation 5 in the film 3, immediately after the film has been lowered by the pilot claw 1 to the extent of one image pitch, and holds this perforation in a fixed position during the exposure or shot for finally releasing the film when the shot is completed and the pilot claw 1 has resumed its uppermost position for feeding the film preparatory to another shot.

The transverse movements of the registration claw 4, obtained by pivoting same about a pin 6, are controlled from a rotary shaft 7 carrying an eccentric cam 8 engaging a corresponding circular aperture formed in a rectangular member 9 on which the fork 10 constituting the lower portion of the registration claw 4 is mounted. The pilot claw 1 is pivoted freely on an eccentric or crank pin 11 carried by a disc 12 rotatably driven from the control or drive shaft 7.

A spring 13 of the blade or wire type has its lower end anchored on the fixed or frame structure of the camera and its upper end adapted constantly to urge the pilot claw 1 toward the film 3 through the medium of a pin 14 engaged by said upper spring end.

The angular position of the pilot claw 1 constantly urged toward the film by the spring 13 is adjusted by a two-armed lever 15 pivoted on a pin 16, another pin 18 secured on the claw 1 engaging the upper arm 17 of this lever, as shown. The other or lower arm of lever 15 engages on the other hand a pin 19 carried by the registration claw 4.

The spring 13 constantly urges the pin 18 of claw 1 for engagement with the rear face of arm 17 of lever 15, and the rear face of the lower arm of this lever 15 engages with its lower portion the pin 19 carried by the registration claw 4. Thus, the angular position of lever 15 and the transverse position of pilot claw 1 are constantly responsive to the transverse position of the registration claw 4.

FIG. 3 shows the registration claw 4 just before reaching position remotest from the film 3, that is, when the lever 15 is about to complete its angular movement in the direction shown by the arrows. Under these conditions, pin 18 on claw 1 has overstepped the point of maximum curvature of the upper portion of arm 17 of lever 15, so that the transverse movement of claw 1 toward the film 3, which is caused by the action of spring 13, is particularly pronounced. Now, as clearly shown notably in FIG. 8, due to the inclined lower face 20 of pilot claw 1 (upwards in the direction of the film 3), the transverse movement of this pilot claw 1 is sufficient for causing this lower inclined face 20 to engage the lower edge of the film perforation 2; thus, the contact between the claw 1 and the film 3 is particularly progressive and smooth, and therefore noiseless, inasmuch as it takes place elastically and, immediately as the contact is established, the claw, which is not driven positively, bears resiliently on the film.

Then the lever 15 continues its movement of rotation in the direction of the arrows to an end angular position such that the pin 18 carried by claw 1 can move longitudinally downwards under the control of the eccentric or crank pin 11; during this movement, the claw 1 carries along the film 3 without any interference from the arm 17 of lever 15, as clearly shown in FIG. 4.

Upon completion of the downward stroke of pilot claw 1, that is, in the position illustrated in FIG. 5, the registration claw 4 rotates and penetrates into the perforation 5 of the film so as to hold the latter against motion and simultaneously cause the rotation of lever 15 in the direction of the arrows to carry along the pin 18 of claw 1 against the resistance of spring 13, thus starting the movement of the pilot claw 1 out from the perforation 2 of film 3.

In the position illustrated in FIG. 6, the registration claw 4 is engaged completely in the perforation 5 of film 3, lever 15 is in its endmost angular position, pilot claw 1 is released completely from perforation 2 of film 3 and commences its upward movement by bearing against the rear face of arm 17 of lever 15 which constitutes a cam face, whereby said face is caused to follow the path shown in chain-dotted lines in the different figures of the drawings.

Shortly before the pilot claw 1 attains its uppermost position the registration claw 4 starts its movement away from the film perforation 5 as shown in FIG. 7. The pilot claw 1 having attained its position remotest from the film 3 continues its upward stroke under the control of the eccentric pin 11 while the lever 15 pivots in the direction of the arrow.

Then, all the component elements of the mechanism resume the position shown in FIG. 3, and the cycle is repeated for each film perforation.

Of course, the specific form of embodiment of the invention which is shown hereinabove with reference to the accompanying drawings should not be construed as limiting the scope of the invention since this embodiment is given by way of example only and many modifications may be brought thereto without departing from the spirit and scope of the invention. Thus, any other suitable and known device could be substituted for the means illustrated for constantly and resiliently urging the pilot claw 1 toward the film and thus causing the claw 1 to engage the film during a movement in a direction substantially perpendicular to the film surface.

What we claim is:

Film-advancing mechanism for a motion-picture camera, which comprises a pilot claw adapted to successively engage the perforations in the film, fed to the camera for the purpose of moving said film downwardly, first drive means for positively driving said pilot claw up and down longitudinally with respect to said film, said pilot claw being mounted for free pivotal motion on said driving means, a spring constantly and resiliently urging said pilot claw transversely toward said film, a registration claw adapted to successively engage the perforations in said film to hold said film in place when it is not being moved by the pilot claw, second drive means for positively driving said registration claw to and fro transversely with respect to said film, a two-armed lever freely mounted for pivotal motion, a pin carried by said registration claw for constant engagement with one arm of said two-armed lever, and a pin carried by said pilot claw for constant engagement by the other arm of said two-armed lever to move said pilot claw away from said film against the force of said spring by the transverse movement of said registration claw toward said film by said second drive means, the surface of the pilot claw that engages the lower edge of each film perforation being slightly inclined upwardly toward the film to engage the said lower edge of the film perforation gradually as said pilot claw is moved resiliently toward the film by said spring.

References Cited by the Examiner

UNITED STATES PATENTS 2,076,189    4/1937    Wittel _____ 226—71

FOREIGN PATENTS 473,169    10/1937    Great Britain.
929,282    7/1947    France.

ROBERT B. REEVES, *Primary Examiner.*

RAPHAEL M. LUPO, SAMUEL F. COLEMAN,
*Examiners.*